United States Patent
Antonucci et al.

(10) Patent No.: US 6,780,537 B1
(45) Date of Patent: Aug. 24, 2004

(54) POLYMERIC MEMBRANE ELECTROCHEMICAL CELL OPERATING AT TEMPERATURES ABOVE 100 C

(75) Inventors: Vincenzo Antonucci, Messina (IT); Antonino Arico', S. Marco D'Alunzio (IT)

(73) Assignee: De Nora S.p.A. (FR)

( * ) Notice: Subject to any disclaimer, the term of this patent is extended or adjusted under 35 U.S.C. 154(b) by 0 days.

(21) Appl. No.: 09/702,322

(22) Filed: Oct. 31, 2000

Related U.S. Application Data

(62) Division of application No. 09/206,849, filed on Dec. 7, 1998, now Pat. No. 6,156,184.

(30) Foreign Application Priority Data

Dec. 10, 1997 (IT) .......................................... MI97A2733

(51) Int. Cl.[7] ................................................ H01M 8/10
(52) U.S. Cl. .............................. 429/41; 429/30; 429/33
(58) Field of Search .............................. 429/30, 33, 41; 205/334, 343; 204/263, 269

(56) References Cited

U.S. PATENT DOCUMENTS 6,017,455 A * 1/2000 Shimoda et al. ....... 210/500.23
6,059,943 A * 5/2000 Murphy et al. ............. 204/296

* cited by examiner

Primary Examiner—James J. Seidleck
Assistant Examiner—Thao Tran
(74) Attorney, Agent, or Firm—Muserlian, Lucas and Mercanti

(57) ABSTRACT

The invention concerns a proton exchange membrane comprising a perfluorosulfonic acid having silica particles embedded therein in a concentration by weight comprised between 0.01 and 50% by weight and dimensions comprised between 0.001 and 10 micrometers, characterized in that said membrane comprises both an amorphous and a crystalline phase and the ratio thereof is adjusted by means of a controlled thermal treatment at a temperature higher than the glass transition temperature, controlled by an X-ray spectrometer. The invention further concerns an electrochemical cell using said membrane, in particular a fuel cell and the method of operating the same.

12 Claims, No Drawings

POLYMERIC MEMBRANE ELECTROCHEMICAL CELL OPERATING AT TEMPERATURES ABOVE 100 C

PRIOR APPLICATION

This application is a division of U.S. patent application Ser. No. 09/206,849 filed Dec. 7, 1998, now U.S. Pat. No. 6,156,184.

DESCRIPTION OF THE INVENTION

The fuel cells are devices wherein the reaction energy released by the combination of a fuel (for example, methanol, ethanol, hydrogen or mixtures of the same) with a comburent (for example pure oxygen, air, chlorine or bromine) is not completely converted to thermal energy but also to electric energy in the form of continuous current. In these devices, the fuel is fed to the anode, which takes a negative polarity, and the comburent is fed to the cathode, which conversely takes a positive polarity. The generation of electric energy in the fuel cell is extremely interesting for the high efficiency of fuel utilization as this process is not negatively affected by the limitations of the Carnot cycle, as well as for the minimum environmental impact as concerns dangerous emissions and noise. In the case pure hydrogen is used as the fuel, the environmental impact is close to zero.

Fuel cells may be schematically classified under different categories, characterized by the type of electrolyte separating the anode and cathode compartments and consequently by the operating temperature range. This classification directly reflects on the type of use proposed or expected for these systems. In particular, fuel cells operating at high temperature, that is above 200° C., are becoming an alternative source of electric energy in large size power stations, also due to the interesting possibilities of co-generation allowed by the high thermal level. On the other hand, the most interesting type of fuel cell in the field of small range power generation, both for stationary and mobile applications (for example transportation) relies on electrolytes consisting of polymeric ion exchange membranes, the use of which at temperatures above 100° C. is conventionally prevented by the need to keep a high internal hydration. Their high current and power density as well as the rapidity in starting-up and achieving full load operation, make the membrane fuel cell much more competitive than any other solution for said applications. However, the limitation of the thermal level permitted by the ion exchange membranes is a severe shortcoming to their commercialization, mainly due to the lack of flexibility of the fuel which can be directly fed to the membrane fuel cell at temperatures below 100° C. In fact, the availability of pure hydrogen is limited to a niche of applications wherein this fuel is present as a by-product, as in the case of chlor-alkali electrolysis plants. The present and future market scenario, at least in the medium time, for a large scale commercialization of said system, foresees the use of fuels available at an existing distribution network and easily transportable, such as liquid fuels. The most promising alternatives to pure hydrogen comprise the light alcohols (methanol, ethanol), or the hydrogen-containing gas mixtures coming from steam reforming or partial oxidation of readily available materials, such as natural gas, liquid hydrocarbons (gasoline, gas oil etc.) and the same light alcohols in the case where the direct feed to the fuel cell is not sufficiently effective. However, none of these alternative fuels is reasonably compatible with the present technology of the ion exchange membrane fuel cells operating at low temperature. The light alcohols are negatively affected by insurmountable problems. In fact, on the one hand, their oxidation kinetics at low temperature is dramatically slow, so that the conventional combustion processes have a better efficiency, even if the electrodes of the fuel cell comprise sophisticated catalysts based on noble metals; on the other hand, the high permeability of commercially available membranes causes a loss of alcohol toward the cathode with the overall result of a decrease of the cell voltage with the consequent further loss of electric efficiency. In the case of hydrogen coming from processing of natural gas, alcohols or fossil fuels, a well known problem is the unavoidable presence of carbon monoxide, which, when higher than 10 ppm, can remarkably penalize the performance of the anodic catalysts at the present operating temperatures. Both the problems connected with the oxidation kinetics of alcohols on noble metals, and the poisoning of the latter by traces of carbon monoxide, may be virtually eliminated increasing the operating temperature above 130° C. Commercial membranes suitable for industrial applications consist of perfluorocarbosulphonic acids (e.g. Nafion® membranes commercialized by Du Pont, U.S.A), which cannot be operated at medium temperature for two different reasons; a first temperature threshold, 100° C., cannot be trespassed due to the difficulty in maintaining the water management of the system, especially when operating with gaseous reactants at low pressure (a condition imposed by most practical applications to maximize the overall efficiency of the system). A second thermal limit, around 130° C., corresponds to the beginning of the transition phase phenomena for most of the perfluorocarbosulphonic acids; above this temperature, crystalline phases begin to segregate inside the polymer giving rise to non homogeneity that affects the electric conductivity and mechanical stability. The nonhomogeneous current distribution, under these conditions, causes thermal hot spots which irreversibly damage the polymer.

An improvement of the water management of perfluorosulfonic membranes was proposed in U.S. Pat. No. 5,523,181. In the case of the fuel cells operating with hydrogen and oxygen or hydrogen and air, the dispersion of fine silica particles inside the polymers favours their water retentive properties, permitting operation of the fuel cells with a reduced water content in the gaseous reactants. In the most favourable cases, the hydration of the membrane may be maintained even without external humidification of the reactant gases, only by the water generated by the reaction. Said invention, at although permitting operation above 100° C. in most industrial process conditions (e.g. feeding reactants under low pressure) does not address the problem of the transition phase of the polymers forming the ion exchange membranes, but it greatly simplifies the system around fuel cells operating at low temperatures.

The above considerations apply also to electrochemical cells incorporating an electrode of the type used in fuel cells, in particular the anode fed with hydrogen, hydrogen-containing gases and alcohols. This type of advanced electrochemical cells permits to obtain remarkable reductions in the energy consumption in various fields of application, such as, for example, salt splitting and electrometallurgy.

The present invention is directed to provide polymeric membrane fuel cells suitable for operation at medium temperature (100–160° C.), with a large flexibility for the choice of the fuel to be fed to the anode (light alcohols, hydrogen from steam reforming or partial oxidation of alcohols or fossil hydrocarbon fuels, or natural gas).

The use of conventional ion exchange polymers at the above mentioned conditions is made possible by improving the invention described in U.S. Pat. No. 5,523,181, referred to by the technical literature as Stonehart membrane (for example, Fuel Cell Seminar 1996 Proceedings., from page 591), which may be obtained by dispersion of $SiO_2$ (0.01–50% by weight) in a liquid phase suspension of the ion exchange polymer with subsequent redeposition of the obtained mixture to form a film having a controlled thickness (typically from 3 to 200 micrometers depending on the applications).

The improvement provided by the present invention consists in a thermal treatment at a temperature above 130° C., and preferably above 150° C., for a period of time ranging from 1 to 60 minutes, preferably from 3 to 15 minutes, to obtain a controlled transition phase of part of the polymer; the degree of conversion from the amorphous phase to the crystalline phase may be controlled by X-ray diffraction during the thermal treatment.

It was surprisingly found that, after this treatment, the mechanical properties of the polymer film are remarkably improved and the operation of the fuel cell at temperatures in the range from 100 to 160° C. is made possible for prolonged periods without any risk of dehydration or non-controlled transition phases.

In particular, the operation of fuel cells at temperature above 130° C. permits a great flexibility in terms of the fuel to be fed to the anode, eliminating the occurrence of poisoning of the noble metal based catalysts by carbon monoxide and other organic compounds, as well as the remarkable increase of the oxidation kinetics of fuels such as methanol and ethanol.

Further, it was surprisingly found that, in the case of cells fed with light alcohols, migration of these fuels through the membrane is remarkably reduced, as indirectly demonstrated by the open circuit voltage which reaches surprisingly high values. The diffusion coefficient of the methanol species was experimentally determined under real working conditions: the obtained value of $1.33 \cdot 10^{-8}$ $cm^2$ $s^{-1}$ is about one thousand times lower than the conventional values reported by the scientific literature (e.g. M. W. Verbrugge, *J. Electrochem. Soc.* 136. N°2, 1989, pages 417–423).

It is a main object of the present invention to provide for an improved proton exchange membrane, suitable for operating at temperatures above 100° C. with a reduced permeation by alcohols, consisting of a perfluorocarbosulfonic acid having embedded therein silica particles with a concentration by weight comprised between 0.01 and 50%, characterized in that said membrane comprises both an amorphous and a crystalline phase and the ratio thereof is adjusted by means of a controlled thermal treatment at a temperature higher than the glass transition temperature.

It is a further object of the present invention to provide for a membrane electrochemical fuel cell wherein a fuel selected in the group comprising methanol, ethanol, hydrogen coming from the processing of hydrocarbons or alcohols is fed to the anode compartment, said fuel cell comprising the improved membrane of the present invention.

The following detailed description is intended to illustrate the various possible uses of the present invention resorting to some representative examples; however it is to be understood that these examples are not to be considered as a limitation of the same.

EXAMPLE 1

In 100 grains of a hydroalcoholic suspension of Nafion® perfluorosulfonic acid (5% by weight, Aldrich) a quantity of silica, $SiO_2$ (Aerosil 200, Degussa) corresponding to 3% by weight, in the form of a fine particulate, with particle diameter below one micrometer was dispersed; the mixture thus obtained was stirred in a ultrasonic bath for 30 minutes. Subsequently, the mixture was deposited on a Petri disc and heated for 30 minutes at 80° C. The film of recast Nafion was detached from the Petri disc by adding distilled water, and let dry for 15 hours at ambient temperature, then interposed between two polytetrafluoroethylene sheets, and compressed at 3 bar. The sample, housed in a Paar HTK-10 chamber for high temperature inserted in a Philips X'Pert System PW 1830 X-ray diffractometer, was subjected to a thermal ramp up to 160° C. controlling the subsequent transition phase of the polymer by XRD. The thermal treatment was stopped when the peak in correspondence of 2q=17° (CuKα) was shifted to 2q=17,8° (CuKα), corresponding to a conversion of 25% of the amorphous phase to the crystalline phase.

At the end of the thermal treatment, the 150 micrometer thick polymeric film was subjected to a purification cycle with 5% hydrogen peroxide and with 1 M sulphuric acid.

The membrane thus obtained was cut out in the desired shape and two ELAT™ electrodes (supplied by E-Tek, Inc., U.S.A), that is a cathode activated with 0.3 $mg/cm^2$ of Pt supported on carbon and an anode activated with 0.6 $mg/cm^2$ of Pt.Ru 1:1 alloy supported on carbon, were hot-pressed on the membrane. The electrode-membrane assembly was inserted into a fuel cell fed with air at 1.5 bar absolute at the cathode and pure hydrogen at the same pressure at the anode. The humidification temperature of the reactants and the cell temperature were maintained at 70° C.

A second reference cell was equipped with the same components as the above cell except for the membrane which was a Nafion® 115 membrane supplied by DuPont, U.S.A, having the same thickness and the same chemical composition of the membrane inserted in the first cell, apart from the addition of silica. The cell was fed with the same reactants and operated with the same process parameters as the first cell.

The cells, having a 50 $cm^2$ active area, were operated at a constant current density of 5 $kA/m^2$ for 8 hours, continuously recording the cell voltage. For both cells, the cell voltage was comprised between 690 and 700 mV, substantially constant with time.

After an overnight shut-down, both cells were operated at 100° C. with reactants humidified at 85° C., the other parameters being kept constant. The cell equipped with the membrane of the present invention at a current density of 5 $kA/m^2$ showed a cell voltage comprised between 705 and 715 mV, constant with time during 8 hours of operation. The cell equipped with the Nafion® 115 membrane showed an initial voltage of 710 mV which decreased progressively to zero within 30 minutes.

EXAMPLE 2

The cells of the previous example, one equipped with the membrane of the present invention and the other with a Nafion® 115 membrane, were fed at the cathode with air at 2 bars absolute and at the anode with a mixture coming from steam reforming of methane and subsequent water shift at the same pressure; the composition of said mixture comprised 65% of hydrogen, 1% of carbon monoxide, in addition to carbon dioxide, water and other inerts. The humidification temperature of the reactants and that of the cells were kept at 70° C.

It was not possible to detect any power generation for the two cells. The temperature of the two cells was subsequently increased to 100° C., and that of reactants humidification to 85° C.; the cell equipped with the reference Nafion® 115 membrane showed feeble traces of current generation, which ceased in a few minutes. The cell equipped with the membrane of the present invention generated 5 kA/m2 of continuous current at a cell voltage of 620 mV. The cell temperature was subsequently raised to 150° C. and under these conditions 5 kA/m2 of continuous current were generated at a cell voltage comprised between 680 and 700 mV during 8 hours of continuous operation.

EXAMPLE 3

The cell of the previous examples equipped with the membrane of the present invention was fed at the anode with a mixture of 2 molar methanol in water pre-heated at 85° C. and at 4.5 bars absolute, and at the cathode with air at 4 bars absolute. A reference cell was equipped with the same components as the first cell but for the membrane which was obtained with the same formulation of the Nafion® perfluorosulfonic acid (5% by weight, Aldrich) and silica, $SiO_2$ (Aerosil 200, Degussa), without any thermal treatment. Also the reference cell was operated at the same operating conditions. The initial temperature of the two cells was 85° C.

The open circuit voltages were 950 mV for the cell equipped with the membrane of the present invention and 890 mV for the reference cell, evidently due to an enhanced methanol crossover.

Both cells were operated at a current density of 2 $kA/m^2$. The cell voltage detected for the cell equipped with the membrane of the invention was 260 mV, progressively reduced to 240 mV in two hours and stabilized around said value in the subsequent six hours. The cell voltage on the reference cell was 60 mV, progressively reduced to 30 mV during the subsequent eight hours.

The temperature of both cells was then raised to 155° C.; under these conditions it was not possible to start up the reference cell as the voltage had fallen to zero in thirty minutes. The cell equipped with the membrane of the invention, at a current density of 2 $kA/m^2$, had an initial cell voltage of 600 mV, which decreased to 550 mV in one hour and then remained stable for the subsequent eight hours. The current density was then raised to 5 $kA/Cm^2$, and under these conditions the cell voltage was stable at 400 mV for eight hours. During this test, the methanol crossover rate through the membrane, detected by gaschromatography, resulted to be $1.33.10^{-8}$ $cm^2$ $s^{-1}$, three orders of magnitude below those reported in the scientific literature.

EXAMPLE 4

The two cells of Example 3 were fed at the anode with a mixture of 2 molar ethanol in water pre-heated at 85° C. and at 4.5 bars absolute, and at the cathode with air at 4 bars absolute; the outlet of the anode compartment was pressurized.

The open circuit voltages measured at a temperature of 85° C. were 820 mV for the cell equipped with the membrane of the present invention and 740 mV for the reference cell.

At such temperature, none of the cells could reach a current density of 0.5 $kA/m^2$.

The temperature of the two cells was then raised to 145° C.; under these conditions, the cell equipped with the membrane of the invention generated 2 $kA/m^2$ of continuous current at a voltage in the range of 460 to 490 mV during eight hours of operation; after a few minute operation at 435 mV at the same current density, the electric output of the reference cell progressively dropped to zero.

EXAMPLE 5

Five fuel cells, having an active area of 50 $cm^2$, equipped with the same membrane-electrode assembly comprising the membrane of the invention described in Example 1, were connected in electrical series in a stack with parallel feeding of the anodic and cathodic reactants.

The cells were fed at the cathode with non humidified air at 4 bars, and maintained at a temperature of 150° C. for the whole test period. The anode was fed first with a mixture containing hydrogen and carbon monoxide as in Example 2, humidified at 85° C., at a pressure of 4 bars. The stack was then started-up at a current density of 5 $kA/m^2$. The average voltage remained in the range of 670 to 680 mV for two hours. The feed line of the anode compartment was then washed and fed with a mixture containing water and methanol as in Example 3; the current density remained stable at 2 $kA/m^2$ for two hours, during which period the average cell voltage remained in the range of 530 to 550 mV.

Then the feed line to the anode compartment was washed and fed with a mixture containing water and ethanol as in Example 4; the current density was maintained at a constant value of 2 $kA/m^2$ for two hours, during which period the average cell voltage remained stable between 425 and 440 mV.

Even if the invention was described in the above examples making reference to specific embodiments, it must be understood that it may be otherwise applied, with modifications or alternative configurations with respect to the above description and said different applications fall within the range of the claimed purposes.

What is claimed is:

1. A method for conditioning a polymeric proton fuel cell exchange membrane for operation at temperatures above 100° C., the method comprising the steps of:
   a: heating a polymeric proton fuel cell exchange membrane to an elevated temperature above its transition temperature;
   b: selecting a desired percentage of conversion of the heated membrane polymer from an initial amorphous state to a crystalline state;
   c: holding said membrane at the elevated temperature for a predetermined interval, wherein the predetermined interval has been selected to permit the desired percentage conversion of amorphous to crystalline state; and
   d: returning the membrane to ambient temperature.

2. The method of claim 1 wherein the said operating temperature is below the glass transition temperature of said membrane.

3. The method of claim 1 wherein the operating temperature of said membrane is at least about 130° C.

4. The method of claim 1 wherein the percentage conversion of crystalline state is determined using X-ray spectroscopy.

5. The method of claim 1 wherein the polymer comprises a hydrocarbon bearing fluorine and sulfate group.

6. The method of claim 1 wherein the polymer comprises a perfluorocarbosulfonic acid polymer.

7. A membrane for a fuel cell that is capable of operating in the range of 100° to about 160° C. wherein the membrane is prepared by the method of claim 1.

8. A membrane for a fuel cell that is capable of operating in the presence of 1% carbon monoxide, wherein the membrane is prepared by the method of claim 1 and is operated at a temperature above 100° C.

9. The membrane of claim 7 wherein the operating temperature is above 130° C.

10. The membrane of claim 7 wherein the operating temperature is less than the glass transition temperature of the polymer.

11. A method of operating a polymer electrolyte membrane fuel cell at elevated temperatures equipped with a membrane conditioned by claim 1 comprising supplying an oxygen containing gas at the cathode and supplying at the anode a fuel selected from the group consisting of hydrogen, reformate, methanol and ethanol.

12. The method of claim 11 wherein the fuel contains carbon monoxide and the operating temperature is at least 100° C.

* * * * *